US011999070B1

(12) United States Patent
Marfione

(10) Patent No.: US 11,999,070 B1
(45) Date of Patent: Jun. 4, 2024

(54) POCKET KNIFE

(71) Applicant: Anthony Louis Marfione, Mills River, NC (US)

(72) Inventor: Anthony Louis Marfione, Mills River, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/488,701

(22) Filed: Oct. 17, 2023

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
CPC .... B26B 1/08; B26B 1/10; B26B 5/00; B26B 5/001; B26B 5/003; B26B 5/005
USPC .............................................................. 30/162
See application file for complete search history.

(56) References Cited

U.S. PATENT DOCUMENTS 2,632,949 A * 3/1953 Falcone .................... B26B 1/08 30/162
4,139,939 A * 2/1979 Crooks ..................... B26B 1/08 30/162
4,769,912 A * 9/1988 Davis ........................ B26B 1/08 30/162
6,085,423 A 7/2000 Marifone
7,305,769 B2 12/2007 McHenry
7,562,455 B2 7/2009 McHenry
7,574,804 B2 8/2009 Bezold
7,797,838 B2 * 9/2010 Chu .......................... B26B 1/10 30/162
8,595,941 B2 12/2013 Lee
8,671,578 B1 3/2014 Frazer
8,966,771 B2 * 3/2015 Chu .......................... B26B 1/08 30/162
9,056,398 B2 * 6/2015 Liao .......................... B26B 1/08
9,375,854 B2 6/2016 Chu
9,498,889 B1 11/2016 Hawk
9,764,485 B1 9/2017 Hawk
10,220,527 B1 3/2019 Marfione
D870,532 S * 12/2019 Marfione ......................... D8/99
D871,187 S * 12/2019 Marfione ......................... D8/99
(Continued)

FOREIGN PATENT DOCUMENTS

WO WO-2019104295 A1 * 5/2019 ............... B26B 1/08

OTHER PUBLICATIONS https://www.reddit.com/r/knifeclub/comments/10vpt13/this_is_what_the_internals_of_the_new_kershaw/.
Photo of internals of the new Kershaw 9000 Livewire.

*Primary Examiner* — Jason Daniel Prone
(74) *Attorney, Agent, or Firm* — Steve LeBlanc, LLC

(57) ABSTRACT

A pocket knife includes a chassis that defines a cavity. A blade having a cutting edge has a retracted position and a deployed position. A slider inside the cavity has a first surface opposed to a second surface. A front operator is inside the cavity, and the slider engages with the front operator to move the blade to the deployed position. A rear operator is inside the cavity, and the slider engages with the rear operator to move the blade to the retracted position. A spring connects the front operator to the rear operator along the first surface of the slider. A longitudinal recess is defined in the chassis. A first boss extends radially from at least one of the front operator or the rear operator and slidingly engages with the longitudinal recess in the chassis.

19 Claims, 6 Drawing Sheets

(56) References Cited

U.S. PATENT DOCUMENTS

| | | | | | |
|---|---|---|---|---|---|
| 10,500,740 | B1 | | 12/2019 | Marfione et al. | |
| D871,887 | S | * | 1/2020 | Marfione | D8/99 |
| D886,563 | S | * | 6/2020 | Marfione | D8/99 |
| D889,239 | S | * | 7/2020 | Marfione | D8/99 |
| 10,807,253 | B1 | | 10/2020 | Mandeville | |
| D903,459 | S | * | 12/2020 | Marfione | D8/99 |
| D903,460 | S | * | 12/2020 | Marfione | D8/99 |
| 10,889,013 | B2 | * | 1/2021 | Scimone | B26B 1/08 |
| 11,207,790 | B2 | * | 12/2021 | Buerk | B26B 1/08 |
| 11,358,291 | B2 | * | 6/2022 | Buerk | B26B 1/08 |
| 11,607,818 | B1 | | 3/2023 | Crawford et al. | |
| 11,639,006 | B1 | * | 5/2023 | Chumchal | B26B 1/08<br>30/162 |
| 11,826,920 | B1 | * | 11/2023 | Mandeville | B26B 1/08 |
| 2006/0207102 | A1 | | 9/2006 | Bezold | |
| 2007/0175045 | A1 | | 8/2007 | McHenry | |
| 2008/0222895 | A1 | | 9/2008 | Marfione | |
| 2008/0222897 | A1 | | 9/2008 | Marione | |
| 2009/0235534 | A1 | | 9/2009 | Chu | |
| 2012/0255179 | A1 | * | 10/2012 | Moizis | B26B 1/08<br>30/162 |
| 2014/0101943 | A1 | | 4/2014 | Chu | |
| 2014/0173911 | A1 | | 6/2014 | Chu | |
| 2021/0276204 | A1 | * | 9/2021 | Marfione | B26B 1/08 |
| 2021/0299893 | A1 | * | 9/2021 | Eckelkamp | B26B 1/08 |
| 2022/0055233 | A1 | * | 2/2022 | Delplanche | B26B 1/08 |
| 2022/0388186 | A1 | * | 12/2022 | King | B26B 1/08 |

* cited by examiner

POCKET KNIFE

FIELD OF THE INVENTION

The present invention generally involves a pocket knife. In particular embodiments, the pocket knife may be a double action, out-the-front configuration.

BACKGROUND OF THE INVENTION

Pocket knives provide a convenient tool for cutting that may be easily carried by a user for deployment when desired. For some pocket knife designs, two hands are needed to deploy and retract a blade, while other designs include a spring that assists a user to deploy and/or retract the blade using a single hand. Each design balances the convenience and speed of operation with increased risk associated with inadvertent operation.

A double action out-the-front pocket knife typically includes a slider, front and rear operators connected by a spring, and front and rear locks. To deploy a double action out-the-front pocket knife, an actuator may be moved forward to move the slider forward. Forward movement of the slider moves the front operator forward while the rear operator is engaged with the rear of the blade to charge the spring. Forward movement of the slider eventually releases the rear lock to allow the charged spring to deploy the blade, and the front lock engages with the deployed blade to hold the blade in the deployed position. To retract a double action out-the-front pocket knife, the actuator is moved rearward to move the slider rearward. Rearward movement of the slider moves the rear operator rearward while the front operator is engaged with the blade to charge the spring. Rearward movement of the slider eventually releases the front lock to allow the charged spring to retract the blade, and the rear lock engages with the retracted blade to hold the blade in the retracted position.

Although a double action out-the-front pocket knife provides convenient one-handed operation, reliable operation requires precise manufacturing tolerances for the moving parts which increase the cost of the pocket knife as well as the cost of replacement parts and repairs. In addition, repeated cycles to deploy and retract the blade erode contact surfaces between the moving parts, resulting in increased play between the moving parts and reduced reliability in deploying and retracting the blade. Therefore, the need exists for an improved pocket knife that allows for reduced manufacturing tolerances while still providing the desired double action functionality over repeated cycles.

BRIEF DESCRIPTION OF THE INVENTION

Aspects and advantages of the invention are set forth below in the following description, or may be obvious from the description, or may be learned through practice of the invention.

One embodiment of the present invention is a pocket knife that includes a chassis that defines a cavity. A blade has a cutting edge, and the blade has a retracted position in which the cutting edge is inside the cavity and a deployed position in which the cutting edge is outside of the cavity. A slider inside the cavity has a first surface opposed to a second surface. A front operator is inside the cavity, and the slider engages with the front operator to move the blade to the deployed position. A rear operator is inside the cavity, and the slider engages with the rear operator to move the blade to the retracted position. A spring connects the front operator to the rear operator along the first surface of the slider. A longitudinal recess is defined in the chassis. A first boss extends radially from at least one of the front operator or the rear operator and slidingly engages with the longitudinal recess in the chassis.

An alternate embodiment of the present invention is a pocket knife that includes a chassis that defines a cavity. A blade has a cutting edge, and the blade has a retracted position in which the cutting edge is inside the cavity and a deployed position in which the cutting edge is outside of the cavity. A slider inside the cavity has a first surface opposed to a second surface. A front operator is inside the cavity, and the slider engages with the front operator to move the blade to the deployed position. A rear operator inside the cavity, and the slider engages with the rear operator to move the blade to the retracted position. A spring connects the front operator to the rear operator along the first surface of the slider. A first plurality of flanges extend radially from at least one of the front operator or the rear operator and engage against the second surface of the slider.

In yet another embodiment of the present invention, a pocket knife includes a chassis that defines a cavity. A blade has a cutting edge, and the blade has a retracted position in which the cutting edge is inside the cavity and a deployed position in which the cutting edge is outside of the cavity. A slider inside the cavity has a first surface opposed to a second surface. A front operator is inside the cavity, and the slider engages with the front operator to move the blade to the deployed position. A rear operator is inside the cavity, and the slider engages with the rear operator to move the blade to the retracted position. A spring connects the front operator to the rear operator along the first surface of the slider. A longitudinal recess is defined in the chassis. A first boss extends radially from at least one of the front operator or the rear operator and slidingly engages with the longitudinal recess in the chassis. A first plurality of flanges extend radially from at least one of the front operator or the rear operator and engage against the second surface of the slider.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
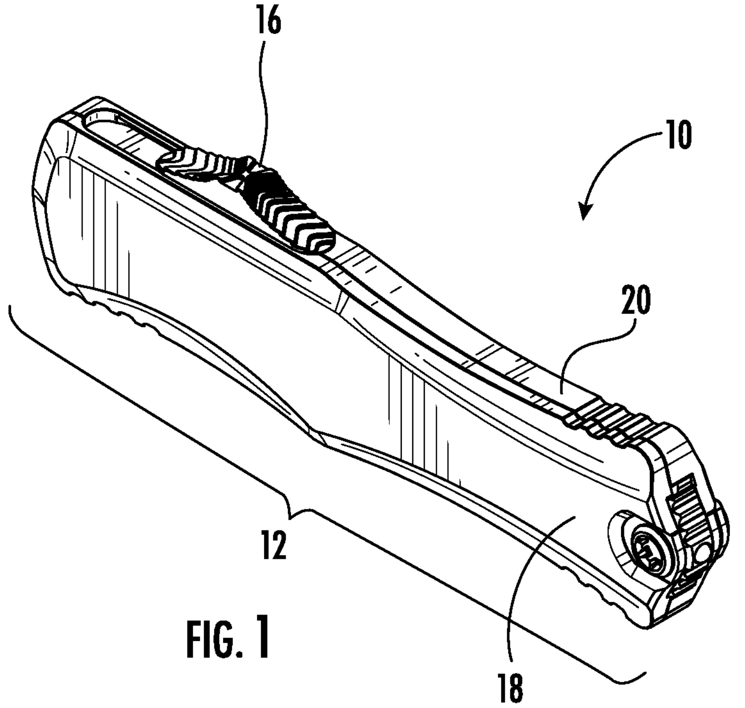
FIG. 1 is a perspective view of a pocket knife according to one embodiment of the present invention in a retracted position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a pocket knife that may be comfortably operated one-handed while accommodating manufacturing tolerances of the components. For convention of reference, the term "front" shall refer to the end of the pocket knife from which a blade deploys; the term "rear" shall refer to the end of the pocket knife that is opposite from the front; the term "top" shall refer to the side of the pocket knife that houses an actuator for operating the pocket knife; the term "bottom" shall refer to the side of the pocket knife that is opposite from the top; and the terms "left" and "right" shall refer to the opposing sides of the pocket knife that are adjacent to and generally perpendicular to the top and bottom. As used herein, the term "longitudinal" shall refer to the direction between the front and rear of the pocket knife, and the term "radial" shall refer to any direction perpendicular to the longitudinal direction.

Figure 2:
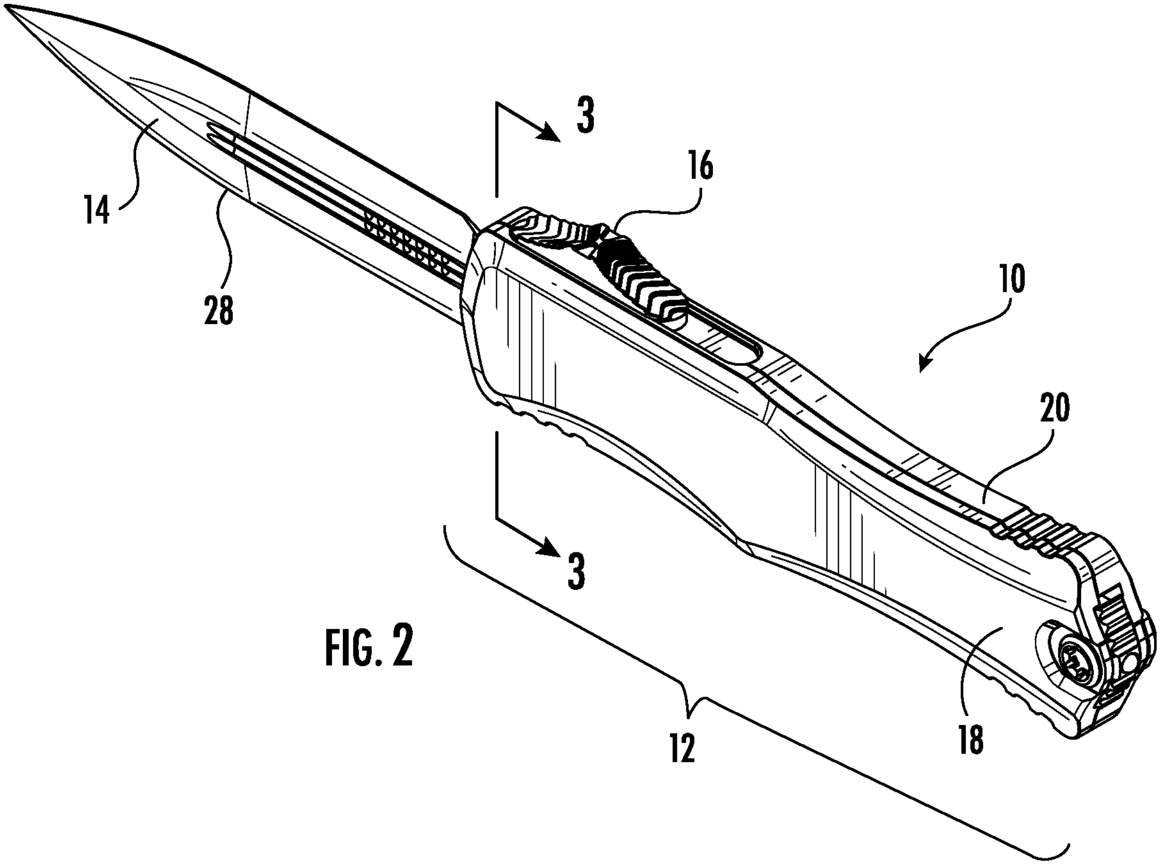
FIG. 2 is a perspective view of the pocket knife shown in FIG. 1 in a deployed position.
Figure 3:
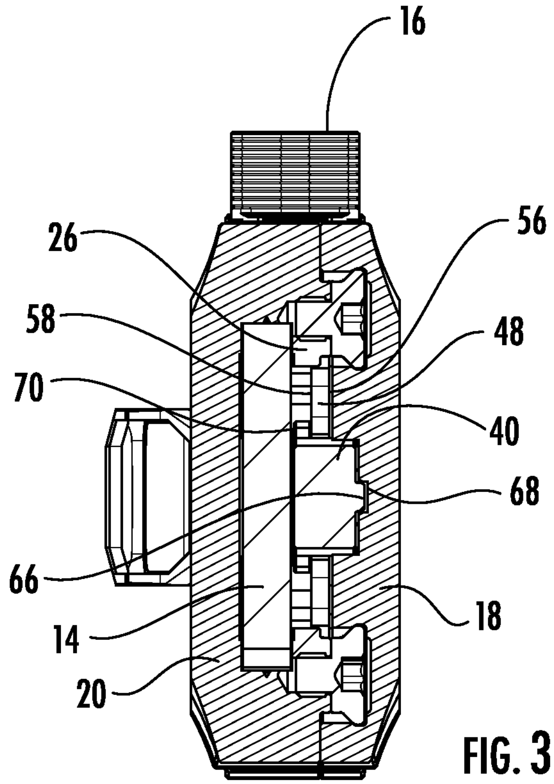
FIG. 3 is an axial cross-section of the pocket knife shown in FIG. 2 taken along 3-3.

FIGS. 1 and 2 provide perspective views of a pocket knife 10 according to one embodiment of the present invention in retracted and deployed positions, respectively, and FIG. 3 provides an axial cross-section of the pocket knife 10 shown in FIG. 2 taken along 3-3. As shown in FIGS. 1-3, the pocket knife 10 generally includes a chassis 12, a blade 14, and an actuator 16.

The chassis 12 provides a frame for supporting the various components associated with the pocket knife 10 and may be molded, pressed, or machined from plastics, metals, polymers, or any material or combination of materials having the desired strength and durability. The chassis 12 generally includes a first or left scale 18 opposed to a second or right scale 20, and when assembled together, the first and second scales 18, 20 produce a cavity 26 inside the chassis 12.

Figure 8:
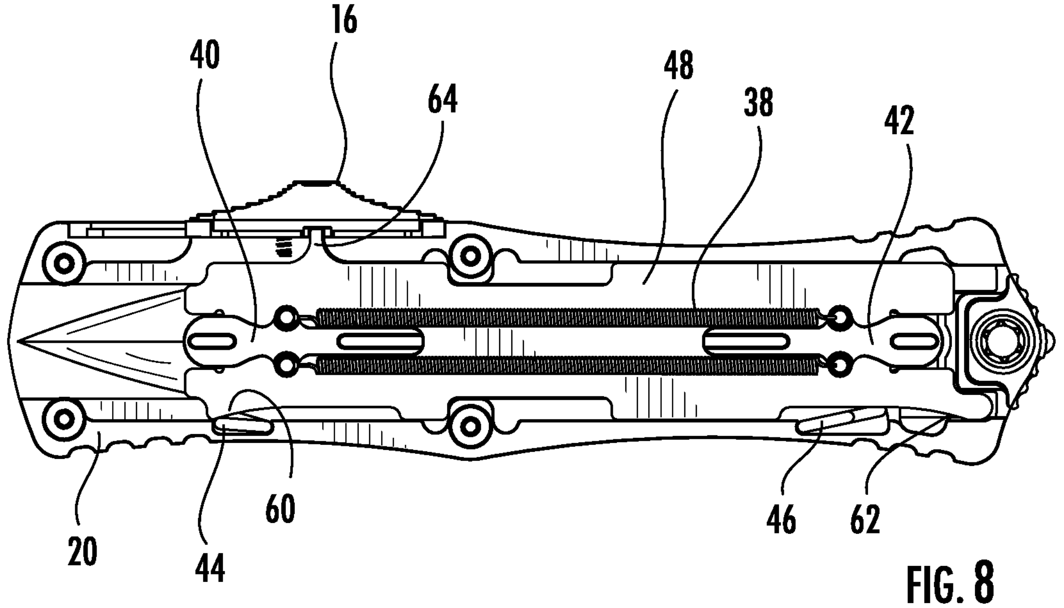
FIG. 8 is a left plan view of the pocket knife shown in FIGS. 1-3 with the left scale removed, the blade in the retracted position, the actuator in the shut position, the slider in the rear position, and the rear lock engaged with the blade.
Figure 9:
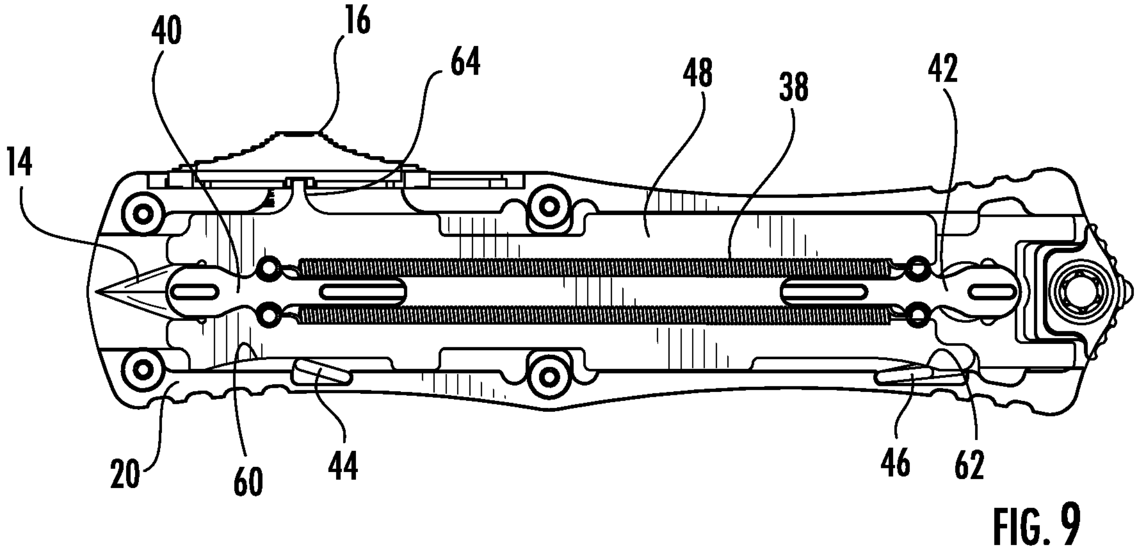
FIG. 9 is a left plan view of the pocket knife shown in FIGS. 1-3 with the left scale removed, the blade in the retracted position, the actuator in the open position, the slider in the front position, and the rear lock released from the blade.
Figure 10:
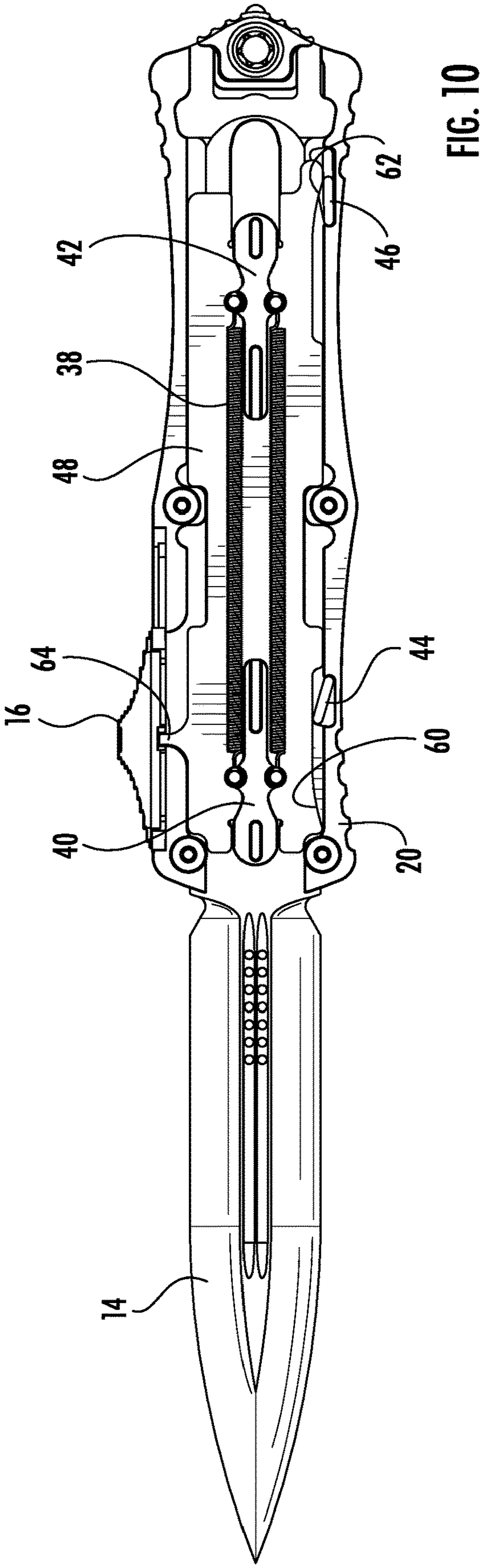
FIG. 10 is a left plan view of the pocket knife shown in FIGS. 1-3 with the left scale removed, the blade in the deployed position, the actuator in the open position, the slider in the front position, and the front lock engaged with the blade.
Figure 11:
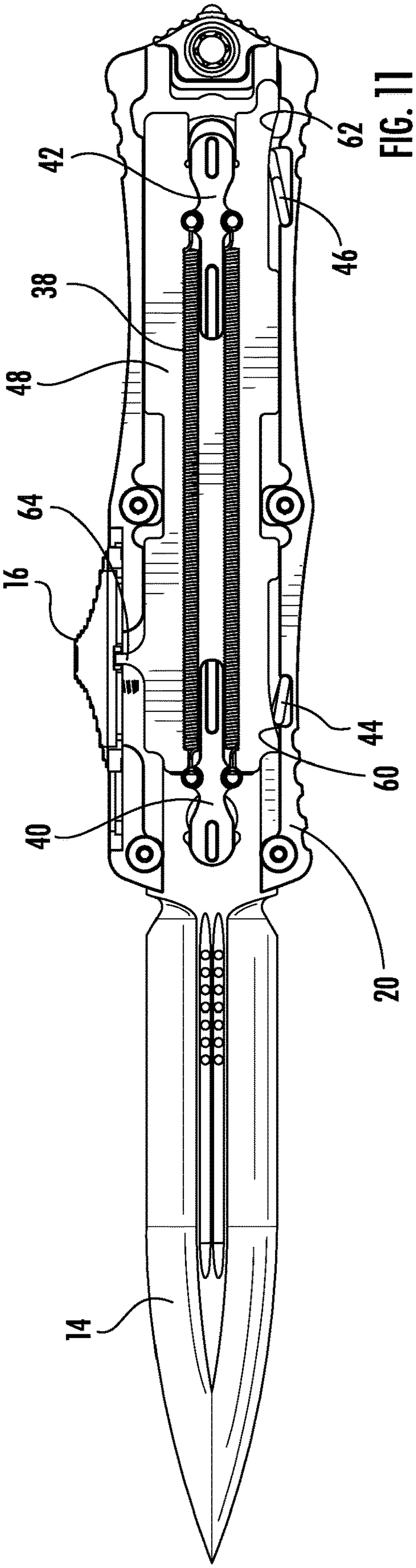
FIG. 11 is a left plan view of the pocket knife shown in FIGS. 1-3 with the left scale removed, the blade in the deployed position, the actuator in the shut position, the slider in the rear position, and the front lock released from the blade.

The blade 14 generally has one or more cutting edges 28 and can move between retracted and deployed positions. In the retracted position, as shown in FIGS. 1, 8, and 9, the cutting edge 28 is inside of the cavity 26 or between the first and second scales 18, 20 to shield the cutting edge 28 from inadvertent contact that might damage the blade 14 or cause harm to personnel or objects. In the deployed position, as shown in FIGS. 2, 10, and 11, the cutting edge 28 is outside of the cavity 26 of the chassis 12 to allow use of the cutting edge 28 as desired.

For the embodiment shown in FIGS. 1-3, the actuator 16 is in sliding contact with the chassis 12 and controls the operation of the pocket knife 10. The actuator 16 has a shut or rear position, shown in FIGS. 1, 8, and 11, that moves the blade 14 to the retracted position and an open or front position, shown in FIGS. 2, 9, and 10, that moves the blade 14 to the deployed position.

Figure 4:
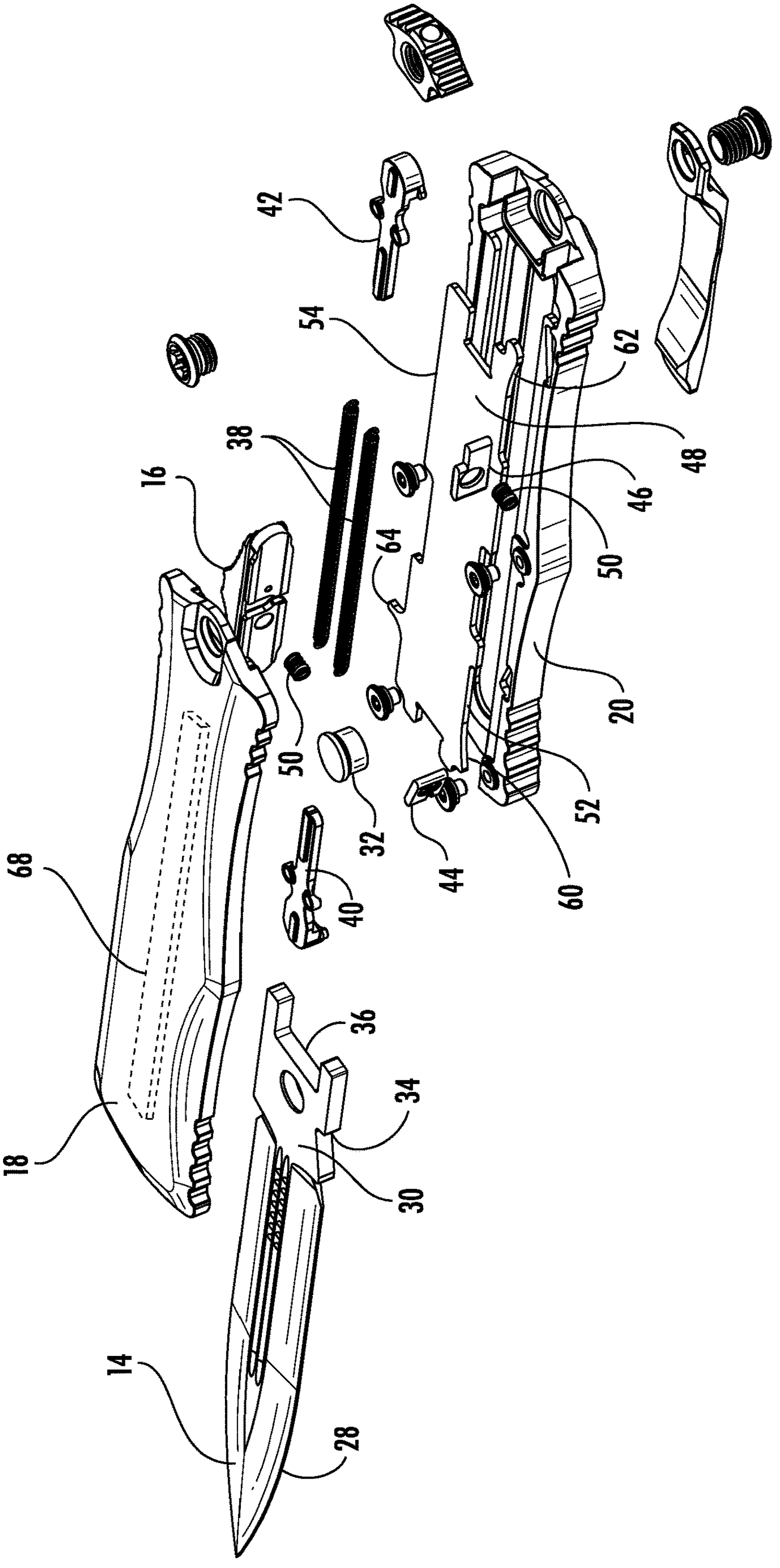
FIG. 4 is an exploded view of the pocket knife shown in FIGS. 1-3.

FIG. 4 provides an exploded view of the pocket knife 10 shown in FIGS. 1-3. As shown in FIG. 4, the rear portion of the blade 14 generally includes a tang 30, and the tang 30 of the blade 14 may include a post 32 and a notch 34 longitudinally separated from a rear surface 36 of the blade 14. In particular embodiments, the post 32 may be simply a projection from the tang 30, while in other embodiments, as shown in FIG. 4, the post 32 may be a separate part threaded or press-fit into the tang 30. The notch 34 may be on one or both sides of the tang 30. The purpose and operation of the post 32, notch 34, and rear surface 36 will be described in more detail with respect to operation of the blade 14 between the retracted and deployed positions as shown in FIGS. 8-11.

As shown most clearly in FIG. 4, one or more springs 38, front and rear operators 40, 42, front and rear locks 44, 46, and a slider 48 may be located inside the cavity 26 of the chassis 12. The springs 38 connect the front operator 40 to the rear operator 42. Although the front and rear operators 40, 42 shown in FIG. 4 are identical, they may not be identical in particular embodiments, and the present invention is not limited to identical front and rear operators 40, 42 unless recited in the claims. As will be explained in more detail with respect to FIGS. 8-11, the front and rear operators 40, 42 alternately engage with the blade 14 and the slider 48 to move the blade 14 between the retracted and deployed positions.

The front and rear locks 44, 46 may be pivotally connected to the chassis 12 and biased radially inward in the cavity 26 by springs 50. With the blade 14 in the retracted position, the rear lock 46 is in biased engagement with the notch 34 in the tang 30 to lock the blade 14 inside the chassis 12. Conversely, with the blade 14 in the deployed position, the front lock 44 is in biased engagement with the rear surface 36 of the tang 30 to lock the blade 14 outside of the chassis 12.

The slider 48 has a bottom side 52 opposed to a top side 54 and a first or left surface 56 opposed to a second or right surface 58 (shown in FIG. 3). The slider 48 may include a front sloped surface 60 and a rear sloped surface 62 on either of the bottom or top sides 52, 54. In the particular embodiment shown in FIG. 4, the front and rear sloped surfaces 60, 62 are located or defined on the bottom side 52 of the slider 48 to engage with the front and rear locks 44, 46 as the slider 48 moves longitudinally in the cavity 26. In alternate embodiments, the front and rear sloped surfaces 60, 62 may be located or defined on opposite sides 52, 54 of the slider 48 to correspond to the positions of the associated front and rear locks 44, 46, and the present invention is not limited to the specific location of the front and rear sloped surfaces 60, 62 unless specifically recited in the claims.

A tab 64 may extend from whichever side of the slider 48 is closest to the actuator 16 so that the tab 64 engages with the actuator 16 and the actuator 16 and the slider 48 move together. In the particular embodiment shown in FIG. 4, for example, the tab 64 extends from the top side 54 of the slider 48. In this manner, forward and rearward movement of the actuator 16 moves the slider 48 the same direction and distance.

The slider 48 has a rear position that moves the blade 14 to the retracted position and a front position that moves the blade 14 to the deployed position. Specifically, with the slider 48 in the front position and the blade 14 locked in the deployed position, as the slider 48 moves to the rear position, the slider 48 engages with the rear operator 42 to increase tension in the springs 38. Rearward movement of the slider 48 causes the front sloped surface 60 to engage with the front lock 44 to pivot the front lock 44 outward, disengaging the front lock 44 from the rear surface 36 of the tang 30 to allow the springs 38 to pull the front operator 40 against the post 32 in the tang 30 to move the blade 14 to the retracted position. Conversely, with the slider 48 in the rear position and the blade 14 locked in the retracted position, as the slider 48 moves to the front position, the slider 48 engages with the front operator 40 to increase tension in the springs 38. Forward movement of the slider 48 causes the rear sloped surface 62 to engage with the rear lock 46 to pivot the rear lock 46 outward, disengaging the rear lock 46 from the notch 34 in the tang 30 of the blade 14 to allow the springs 38 to pull the rear operator 42 against the rear surface 36 of the tang 30 to move the blade 14 to the deployed position.

Figure 5:
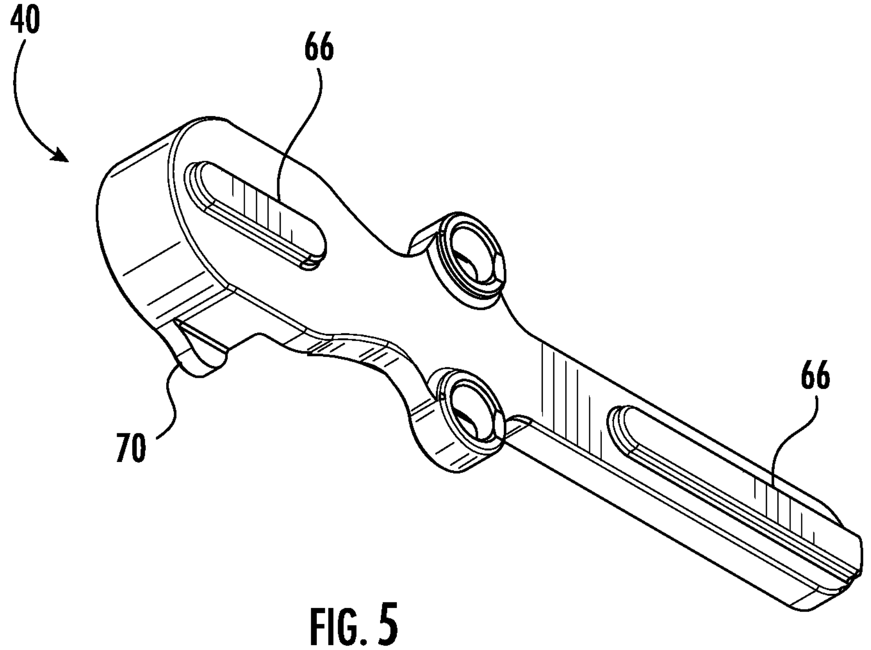
FIG. 5 is a perspective view of an operator shown in FIG. 4.
Figure 6:
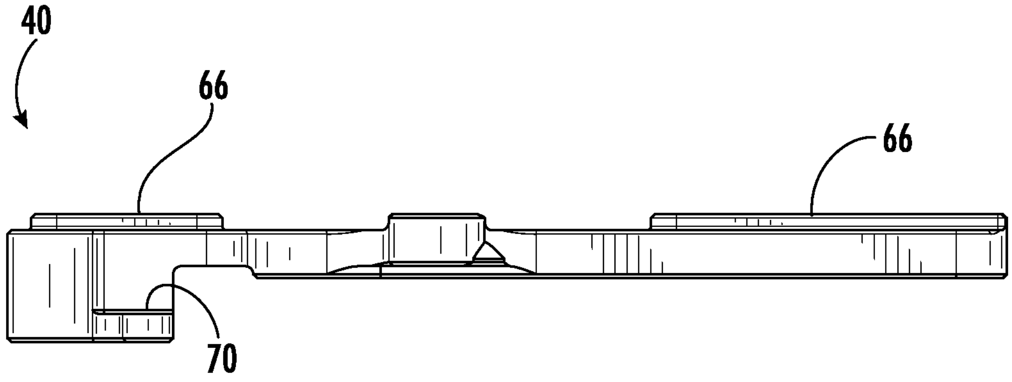
FIG. 6 is a side plan view of the operator shown in FIG. 5.
Figure 7:
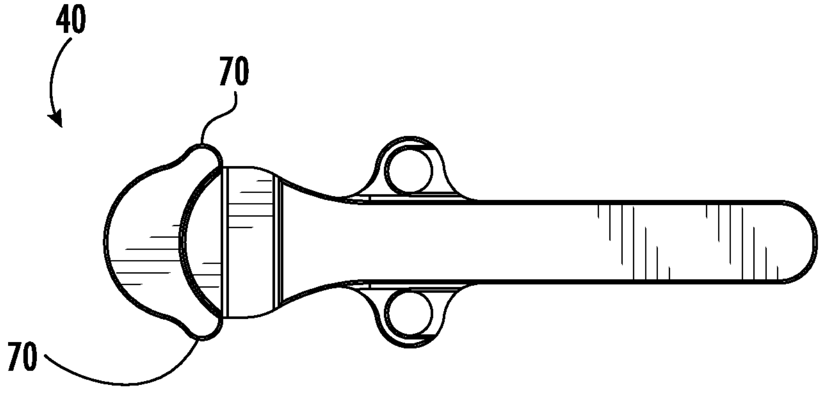
FIG. 7 is a bottom plan view of the operator shown in FIG. 5.

FIGS. 5, 6, and 7 provide perspective, side plan, and bottom plan views, respectively, of an exemplary front or rear operator 40, 42 as shown in FIG. 4. As shown in FIGS. 5-7, one or both of the operators 40, 42 may include one or more radially extending bosses 66. The purpose of each boss 66 is to enhance the alignment and stability of the operators 40, 42 along the longitudinal axis as the operators move longitudinally inside the chassis 12. Specifically, as shown in FIG. 3 and in phantom in FIG. 4, a longitudinal recess 68 is defined in the chassis 12, and each boss 66 slidingly engages with the longitudinal recess 68 in the chassis 12. The sliding engagement between the boss 66 and the longitudinal recess 68 aligns the operators 40, 42 inside the chassis 12 while preventing the operators 40, 42 from rotating around the longitudinal axis to enhance the smooth and reliable operation of the pocket knife 10 as the slider 48 moves the blade 14 between the retracted and deployed positions.

Alternately or in addition, one or both of the operators 40, 42 may include one or more radially extending flanges 70 that engage against the left or right surface 56, 58 of the slider 48 to enhance the stability of the operators 40, 42 along the longitudinal axis as the operators move longitudinally inside the chassis 12. As shown in FIG. 4, for example, the springs 38 may connect the front operator 40 to the rear operator 42 along the first or left surface 56 of the slider 48, and the flanges 70 extending from the front and/or rear operators 40, 42 may engage against the second or right surface 58 of the slider 48, as best shown in FIG. 3. The engagement between the flanges 70 and the second or right surface 58 of the slider 48 allows the operators 40, 42 to move longitudinally inside the chassis 12 while preventing the operators 40, 42 from rotating about the longitudinal axis to enhance the smooth and reliable operation of the pocket knife 10 as the slider 48 moves the blade 14 between the retracted and deployed positions.

Operation of the pocket knife 10 between the retracted and deployed positions will now be described with respect to FIGS. 8-11. As shown in FIG. 8, the actuator 16 is in the shut position, and the slider 48 is in the rear position with the blade 14 retracted inside the cavity 26. With the blade 14 in the retracted position, the rear operator 42 is engaged with the rear surface 36 of the tang 30, and the rear lock 46 is engaged with the notch 34 in the tang 30 to retain the blade 14 in the retracted position.

To deploy the blade 14, the actuator 16 is moved forward to the open position as shown in FIG. 9, and the engagement between the tab 64 and the actuator 16 causes the slider 48 to move forward with the actuator 16. As the slider 48 initially moves forward, the rear lock 46 remains engaged with the notch 34 in the tang 30 to prevent the blade 14 from moving, and the front of the slider 48 engages with the front operator 40 to move the front operator 40 forward and increase tension in the springs 38 between the front and rear operators 40, 42. Eventually, the rear sloped surface 62 on the bottom side 52 of the slider 48 disengages the rear lock 46 from the notch 34 to release the blade 14, as shown in FIG. 9.

When the rear lock 46 disengages from the notch 34, the tension in the springs 38 causes the rear operator 42 to eject the blade 14 out of the cavity 26 to the deployed position, as shown in FIG. 10. The blade 14 moves out of the cavity 26 until the post 32 contacts the front operator 40 to prevent further travel of the blade 14 out of the cavity 26. As shown in FIG. 10, the actuator 16 is in the open position with the blade 14 deployed outside of the cavity 26. In the deployed position, the front operator 40 is engaged with the post 32, and the front lock 44 is engaged with the rear surface 36 of the tang 30 to hold the blade 14 in the deployed position.

To retract the blade 14, the actuator 16 is moved rearward to the shut position as shown in FIG. 11, and the engagement between the tab 64 and the actuator 16 causes the slider 48 to move rearward with the actuator 16. As the slider 48 initially moves rearward, the front lock 44 remains engaged with the rear surface 36 of the tang 30 to prevent the blade 14 from moving, and the rear of the slider 48 engages with the rear operator 42 to move the rear operator 42 rearward and increase tension in the springs 38 between the front and rear operators 40, 42. Eventually, the front sloped surface 60 on the bottom side 52 of the slider 48 disengages the front lock 44 from the rear surface 36 of the tang 30 to release the blade 14, as shown in FIG. 11.

When the front lock 44 disengages from the rear surface 36 of the tang 30, the tension in the springs 38 causes the front operator 40 to pull the blade 14 into the cavity 26 to the retracted position, as shown in FIG. 8. The blade 14 moves into the cavity 26 until the rear surface 36 of the tang 30 contacts the rear operator 42, and the rear lock 46 again engages with the notch 34 in the tang 30 to retain the blade 14 in the retracted position.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A pocket knife, comprising:

a chassis, wherein said chassis defines a cavity;

a blade having a cutting edge, wherein said blade has a retracted position in which said cutting edge is inside said cavity and a deployed position in which said cutting edge is outside of said cavity;

a slider inside said cavity, wherein said slider has a first surface opposed to a second surface;

a front operator inside said cavity, wherein said slider engages with said front operator to move said blade to said deployed position;

a rear operator inside said cavity, wherein said slider engages with said rear operator to move said blade to said retracted position;

at least one spring connecting said front operator to said rear operator along said first surface of said slider;

a longitudinal recess defined in said chassis;

a first boss that extends radially from at least one of said front operator or said rear operator and slidingly engages with said longitudinal recess in said chassis; and a plurality of front flanges that extend radially from said front operator and engage against said second surface of said slider.

2. The pocket knife as in claim 1, wherein said first boss extends radially from said front operator and further comprising a second boss that extends radially from said rear operator and slidingly engages with said longitudinal recess in said chassis.

3. The pocket knife as in claim 1, further comprising a plurality of rear flanges that extend radially from said rear operator and engage against said second surface of said slider.

4. The pocket knife as in claim 1, further comprising the at least one spring is a plurality of springs connecting said front operator to said rear operator along said first surface of said slider.

5. The pocket knife as in claim 1, further comprising a front lock inside said cavity and engaged with said blade in said deployed position.

6. The pocket knife as in claim 1, further comprising a rear lock inside said cavity and engaged with said blade in said retracted position.

7. A pocket knife, comprising:

a chassis, wherein said chassis defines a cavity;

a blade having a cutting edge, wherein said blade has a retracted position in which said cutting edge is inside said cavity and a deployed position in which said cutting edge is outside of said cavity;

a slider inside said cavity, wherein said slider has a first surface opposed to a second surface;

a front operator inside said cavity, wherein said slider engages with said front operator to move said blade to said deployed position;

a rear operator inside said cavity, wherein said slider engages with said rear operator to move said blade to said retracted position;

a first spring connecting said front operator to said rear operator engaging said first surface of said slider; and a first plurality of flanges that extend radially from at least one of said front operator or said rear operator and engage against said second surface of said slider.

8. The pocket knife as in claim 7, wherein said first plurality of flanges extend radially from said front operator and further comprising a second plurality of flanges that extend radially from said rear operator and engage against said second surface of said slider.

9. The pocket knife as in claim 7, further comprising a longitudinal recess defined in said chassis and a front boss that extends radially from said front operator and slidingly engages with said longitudinal recess in said chassis.

10. The pocket knife as in claim 7, further comprising a longitudinal recess defined in said chassis and a rear boss that extends radially from said rear operator and slidingly engages with said longitudinal recess in said chassis.

11. The pocket knife as in claim 7, further comprising a second spring connecting said front operator to said rear operator along said first surface of said slider.

12. The pocket knife as in claim 7, further comprising a front lock inside said cavity and engaged with said blade in said deployed position.

13. The pocket knife as in claim 7, further comprising a rear lock inside said cavity and engaged with said blade in said retracted position.

14. A pocket knife, comprising:

a chassis, wherein said chassis defines a cavity;

a blade having a cutting edge, wherein said blade has a retracted position in which said cutting edge is inside said cavity and a deployed position in which said cutting edge is outside of said cavity;

a slider inside said cavity, wherein said slider has a first surface opposed to a second surface;

a front operator inside said cavity, wherein said slider engages with said front operator to move said blade to said deployed position;

a rear operator inside said cavity, wherein said slider engages with said rear operator to move said blade to said retracted position;

a first spring connecting said front operator to said rear operator along said first surface of said slider;

a longitudinal recess defined in said chassis;

a first boss that extends radially from at least one of said front operator or said rear operator and slidingly engages with said longitudinal recess in said chassis; and a first plurality of flanges that extend radially from at least one of said front operator or said rear operator and engage against said second surface of said slider.

15. The pocket knife as in claim 14, wherein said first boss extends radially from said front operator and further comprising a second boss that extends radially from said rear operator and slidingly engages with said longitudinal recess in said chassis.

16. The pocket knife as in claim 14, wherein said first plurality of flanges extend radially from said front operator and further comprising a second plurality of flanges that extend radially from said rear operator and engage against said second surface of said slider.

17. The pocket knife as in claim 14, further comprising a second spring connecting said front operator to said rear operator along said first surface of said slider.

18. The pocket knife as in claim 14, further comprising a front lock inside said cavity and engaged with said blade in said deployed position.

19. The pocket knife as in claim 14, further comprising a rear lock inside said cavity and engaged with said blade in said retracted position.

* * * * *